US007310212B2

(12) United States Patent
Chang et al.

(10) Patent No.: US 7,310,212 B2
(45) Date of Patent: Dec. 18, 2007

(54) CONNECTOR

(75) Inventors: Chi-Tung Chang, Taipei (TW); Ricky Kao, Taipei (TW)

(73) Assignee: Alcor Micro, Corp. (TW)

( * ) Notice: Subject to any disclaimer, the term of this patent is extended or adjusted under 35 U.S.C. 154(b) by 467 days.

(21) Appl. No.: 11/113,801

(22) Filed: Apr. 25, 2005

(65) Prior Publication Data

US 2006/0238942 A1 Oct. 26, 2006

(51) Int. Cl.
*H02H 3/00* (2006.01)

(52) U.S. Cl. ...................................... 361/93.1; 361/119

(58) Field of Classification Search ............... 361/93.1, 361/119

See application file for complete search history.

(56) References Cited

U.S. PATENT DOCUMENTS 4,414,741 A * 11/1983 Holt ............................ 29/837
7,044,802 B2 * 5/2006 Chiou et al. ................ 439/660
2001/0034156 A1 * 10/2001 Yamane ...................... 439/492

FOREIGN PATENT DOCUMENTS

JP 2000-3415 A * 7/2000

* cited by examiner

*Primary Examiner*—Ronald W. Leja

(57) ABSTRACT

A connector includes a base board having at least four contacts provided on each of two opposite sides thereof. The contacts on the second side of the base board are arranged in the reverse order relative to the contacts on the first side of the base board, and some of the contacts on the first and the second side of the base board are electrically connected to one another to enable the connector to plug in and electrically connect to a corresponding female connector.

15 Claims, 3 Drawing Sheets

CONNECTOR

FIELD OF THE INVENTION

The present invention relates to a connector, and more particularly to a connector having metal contacts provided on two opposite sides thereof.

BACKGROUND OF THE INVENTION

After many times of system integration and improvement in the connection and transmission apparatus for computers, universal serial bus (USB) finally becomes a main trend of the specification for computer peripheral interfaces. The USB not only provides conveniences in application of software, such as the mode of plug and play, but also has a transmission rate satisfying the current market demands. Therefore, USB interface has been employed in various applications, such as external storage medium, external playback medium, data transmission between hard disks, etc. Therefore, all the currently electronic products with a calculating system and other consumptive electronic products must have a USB interface to be successfully accepted in the market.

According to prior art, a male USB connector must be plugged in a corresponding female USB connector with a predetermined side of the male USB connector facing downward or upward relative to the female USB connector. This design causes a certain degree of inconvenience to users. For example, for a general desktop computer, the female USB connector is usually provided at a rear side of the computer case, and the user has to bend or knee to locate it before plugging the male USB connector with the correct side thereof facing toward the correct direction. And, for a notebook computer, the female USB connector is usually provided on an outer peripheral edge of the computer. When the female USB connector is provided on a rear edge of the computer, the user still has to try and locate it before plugging the male USB connector.

In view of the current trend of integrating a computer into household appliances, it is certain complex household appliances would finally become the main trend in the market. That is, it is very possible various kinds of connectors of different specifications are provided here and there on the outer surface of these complex household appliances. Thus, it would be much more convenient to have a USB connector that could be plugged in a complex household appliance without the need of checking whether the connector has been correctly plugged.

With so many conveniences provided by it, the USB connector naturally becomes highly competitive among other connectors of different specifications. However, there are many different brands of electronic products in the market, such as FUJI, CANON, PANTEX, SONY, etc., which have their own specific memory card with a unique specification, such as SD (Smart Card), MS (Memory Stick), MMC (Multi-medium Card), etc. A common feature for these different brands of electronic products is a male connector could be plugged in a female connector only with a correct side of the male connector facing toward a correct direction. In other words, a user has to be certain the male connector has been plugged in the female connector with a correct side of the male connector facing upward or downward as specified. It is possible a user carelessly incorrectly plugs the male connector, or the hardware is installed in a manner different from the typical manner to result in damages in hardware.

SUMMARY OF THE INVENTION

A primary object of the present invention is to provide a novel connector that could be plugged in a female USB connector with either a front or a reverse side of the male connector facing upward or downward relative to the female USB connector.

Another object of the present invention is to provide a novel connector that could be plugged in a female connector in a card slot of a memory card, such as SD, MS, MMC, XD, mini-SD, or other types of memory cards, without the need of checking whether the connector has been plugged in a correct position.

A further object of the present invention is to provide a novel connector that enables a USB connector to be more competitive among future complex household appliances that have a computer integrated thereinto and require various connectors of different specifications.

To achieve the above and other objects, the connector according to a preferred embodiment of the present invention includes a base board having at least four contacts provided on each of two opposite sides thereof. The contacts on the second (or reverse) side of the base board are arranged in the reverse order relative to the contacts on the first (or front) side of the base board, and some of the contacts on the first and the second side of the base board are electrically connected to one another to enable the connector to plug in and electrically connect to a corresponding female connector.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
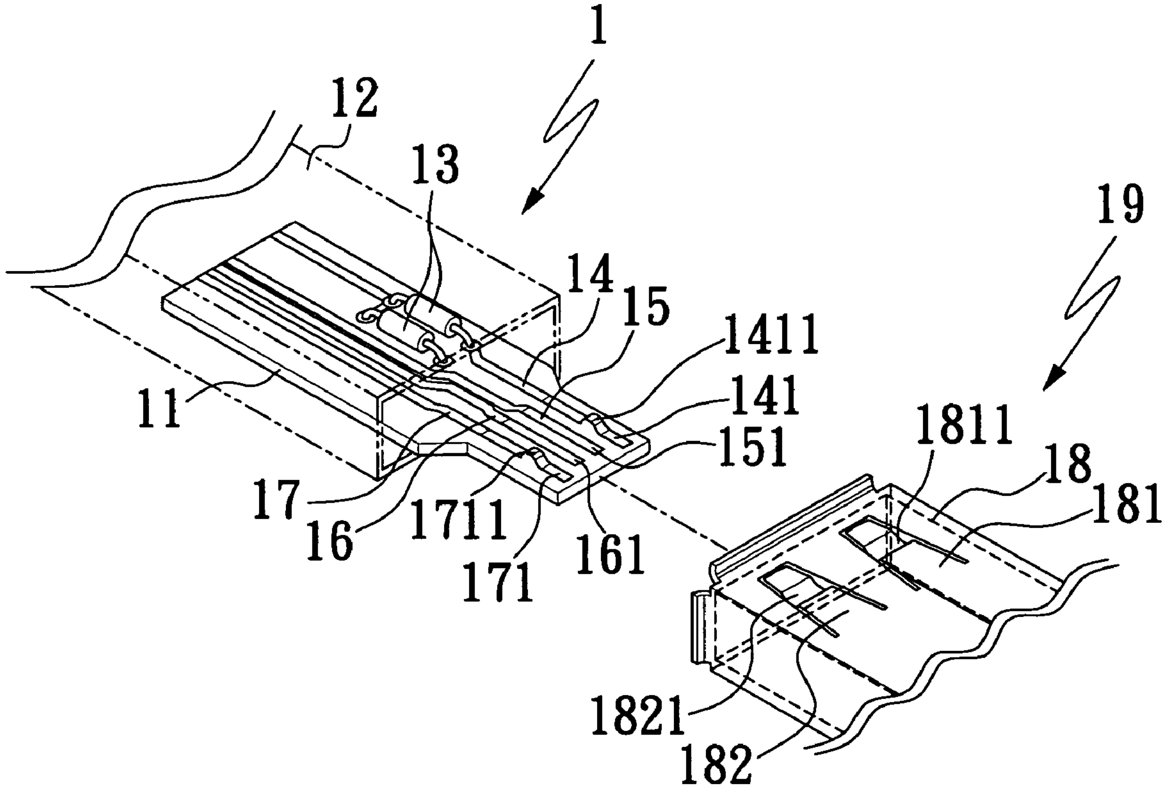
FIG. 1 is a phantom perspective view showing a connector according to a first preferred embodiment of the present invention.
Figure 2:
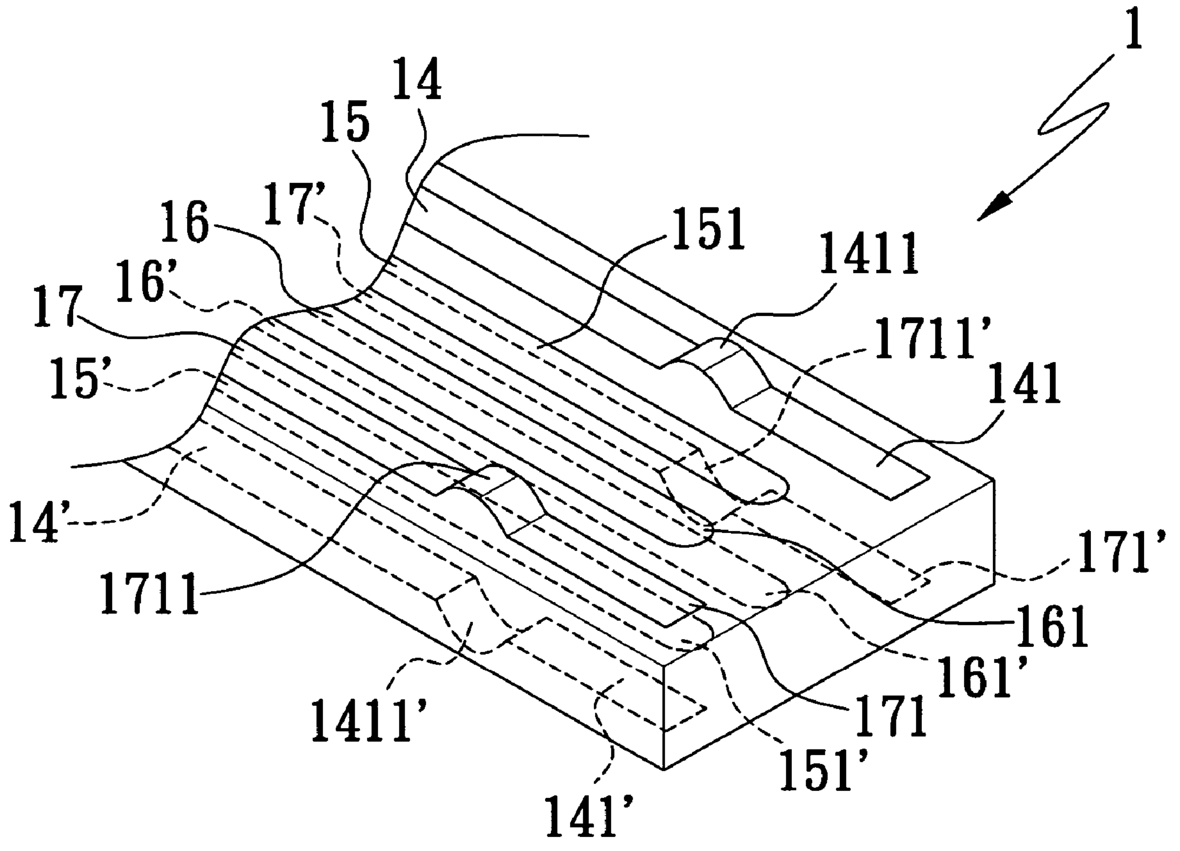
FIG. 2 is a fragmentary and enlarged view of the connector of FIG. 1.

Please refer to FIGS. 1 and 2, in which a connector 1 according to a first preferred embodiment of the present invention is shown. As shown, the connector 1 includes a base board 11, a housing 12, and a short-circuit protection 13.

The base board 11 is a multi-layer circuit board being provided on each of two opposite sides thereof with at least four contacts, such as the strip electrodes 141(5V), 151(D+), 161(D−), and 171(GND) provided on the front side of the base board 11, and the strip electrodes 141' (5V), 151' (D+), 161' (D−), and 171' (GND) provided on the reverse side of the base board 11 as shown in FIG. 2. It is noted the four contacts provided on the reverse side of the base board 11 are arranged in the reverse order relative to the four contacts on the front side, and some of the contacts on the front and the reverse side are electrically connected to one another. More specifically, a plurality of circuits 14, 15, 16, and 17 are provided on the base board 11 to electrically connect to one another, so as to enable electrical connection of the connector 1 with a female connector, such as the female USB connector 18 shown in FIG. 1. The strip electrodes 141, 151, 161, and/or 171 may be further provided at predetermined positions with locating mechanisms to ensure firm connection of the connector 1 with a USB interface provided on an external device or apparatus. In the first preferred embodiment of the present invention illustrated in FIGS. 1 and 2, the strip electrodes 141 and 171 on the front side of the base board 11 are respectively provided with locating mechanisms 1411 and 1711, and the strip electrodes 141' and 171' on the reverse side of the base board 11 are respectively provided with locating mechanisms 1411' and 1711'. When the connector 1 is plugged in the female USB connector 18, which is enclosed in a case 19, the locating mechanisms 1411, 1711 in the form of, for example, two upward protruded sections are engaged with two locating mechanisms 1811, 1821 in the form of two depressed sections on two pressing plates 181, 182 provided in the female USB connector 18, so as to firmly but detachably hold the connector 1 in the female USB connector 18.

Since the base board 11 of the connector 1 is provided at the front and reverse sides with strip electrodes having the same configuration, that is, the reverse side of the base board 11 is also provided with locating mechanisms 1411' and 1711' identical to the locating mechanisms 1411 and 1711 on the front side of the base board 11, respectively, the connector 1 can be plugged in and firmly connected to the female USB connector 18 with either the front side or the reverse side facing upward relative to the female USB connector 18.

The short-circuit protection 13 is located on one side of the base board 11 to electrically connect to all the contacts provided on the front and the reverse side of the base board 11. In the present invention, the short-circuit protection 13 may be a diode device, an analog switch, or a stabilizer IC.

The housing 12 protectively encloses the base board 11 and the short-circuit protection 13 therein.

With the above arrangements, the connector 1 according to the first preferred embodiment of the present invention is suitable for applying to a USB flash disk, so that the USB flash disk could be connected to a corresponding female connector with either a front or a reverse side of the USB flash disk facing upward relative to the female connector.

Figure 3:
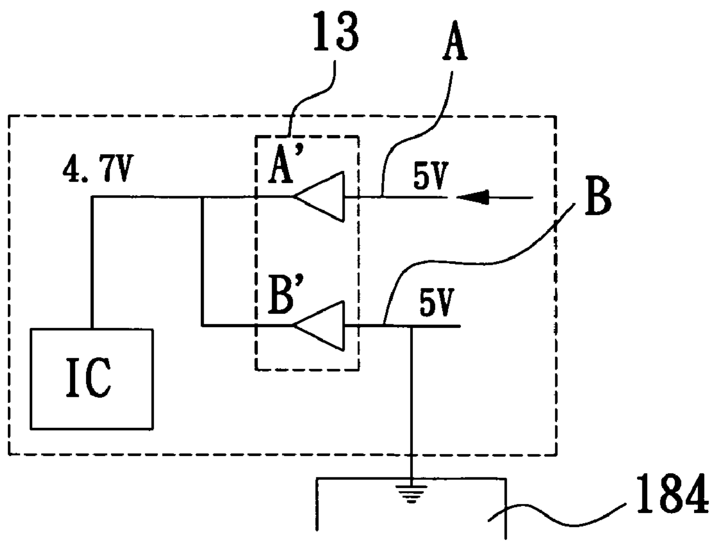
FIG. 3 is a circuit diagram for the connector of FIG. 1.

FIG. 3 is a circuit diagram of the connector 1. Please refer to FIGS. 2 and 3 at the same time. In FIG. 3, circuit A is used to collectively represent the circuits 14, 15, 16, and 17 provided on the front side of the base board 11, and circuit B is used to collectively represent the circuits 14', 15', 16', and 17' provided on the reverse side of the base board 11; and therefore, in FIG. 3, the side with circuit A and the side with circuit B actually refer to the front side and the reverse side of the base board 11, respectively. As can be seen from FIG. 3, the circuit A has a DC power supply of 5V from the female USB connector 18 when the connector 1 is plugged in the female USB connector 18 with the front side facing upward. Similarly, when the connector 1 is plugged in the female USB connector 18 with the reverse side facing upward, the circuit B also has a DC power supply of 5V from the female USB connector 18. The 5V DC power supply passes diodes A' and B' in the short-circuit protection 13 before being supplied to an IC in the connector 1 of the present invention. FIG. 3 shows the connector 1 is plugged in the female USB connector 18 with the front side of the base board 11 facing upward relative to the female connector. However, there is a ground connector 184 provided at a lower inner side of the female USB connector 18, and it is hard to tell from FIG. 3 that to which circuit the ground connector 184 is connected. Nevertheless, in the connector 1 of the present invention, since the strip electrodes 171, 161, 151, and 141 connected to the circuits 17, 16, 15, and 14 are provided on the front side of the base board 11 to respectively correspond to the ground (GND), the D−, the D+, and the 5V DC power supply, and the strip electrodes 171', 161', 151', and 141' connected to the circuits 17', 16', 15', and 14' are provided on the reverse side of the base board 11 to respectively correspond to the ground (GND), the D−, the D+, and the 5V DC power supply, and the strip electrodes on the reverse side of the base board 11 are arranged in the reverse order relative to the strip electrodes on the front side of the base board 11, USB signals of 5V, GND, D+, and D− from the female USB connector 18 could always be correctly transmitted to the connector 1 no matter how the connector 1 is plugged in the female USB connector 18.

It is noted the strip electrode 141 should never be directly electrically connected with the strip electrode 141'. In case of a direct connection of the strip electrode 141 with the strip electrode 141', the 5V DC power supply from the female USB connector 18 would short-circuit to the ground connector 184 when the connector 1 is plugged in the female USB connector 18, no matter which side of the base board 11 faces upward. The short-circuit protection 13 is provided to prevent the above-mentioned short circuit. In the present invention, the short-circuit protection 13 includes the circuit A, the circuit B, a first diode A', and a second diode B'. The circuit A and the circuit B are connected in parallel, so that the 5V DC power supply from the female USB connector 18 could always be transmitted to the connector 1 via the first diode A' or the second diode B', no matter how the connector 1 is plugged in the female USB connector 18. The short-circuit protection 13 may be otherwise a stabilizer IC or an analog switch to prevent the 5V strip electrodes 141 or 141' from grounding to short-circuit the 5V DC power supply.

Figure 4:
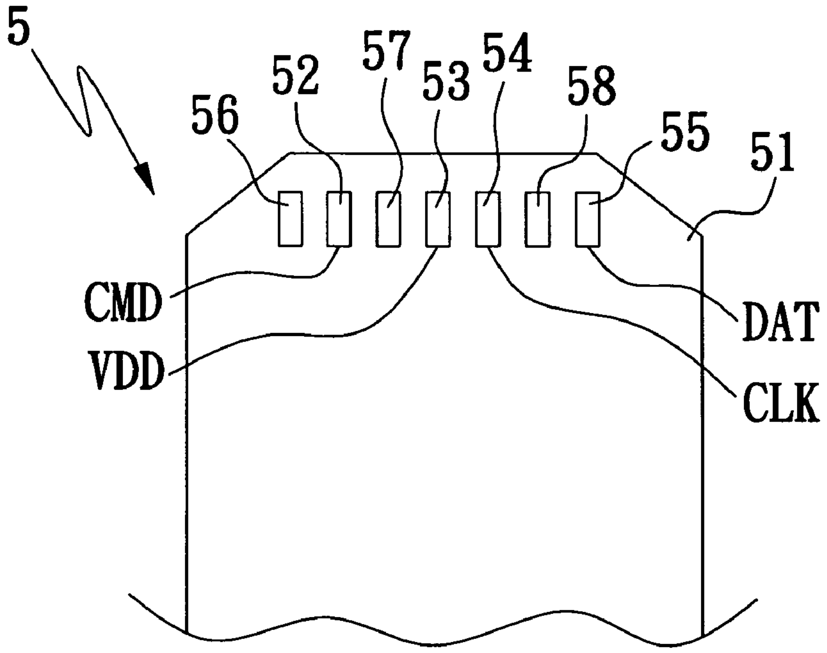
FIG. 4 is a fragmentary top plan view of a connector according to a second embodiment of the present invention.

FIG. 4 shows a connector 5 according to a second embodiment of the present invention for an extended usage with currently commercially available multi-medium cards (MMC's). Unlike the conventional MMC connectors that have only one chamfered front corner and can therefore be plugged in a corresponding female connector with only one predetermined side facing upward, the connector 5 according to the second embodiment of the present invention has two chamfered front corners and could be plugged in a corresponding female connector with either a front or a reverse side thereof facing upward. The connector 5 includes abase board 51, which is a multi-layer circuit board having a plurality of contacts provided at each of two opposite sides thereof. In the illustrated FIG. 4, there are seven contacts, namely, strip electrodes 52 (CMD), 53 ($V_{DD}$), 54 (CLK), 55 (DAT), 56, 57, and 58, provided on a front side of the base board 51. Another seven strip electrodes (not shown) are also provided on a reverse side of the base board 51 in the reverse order relative to the seven contacts on the front side. At least three of these contacts are electrically connected to one another, so as to enable the connector 5 to electrically connect with a corresponding female connector.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A connector, comprising a base board having at least four contacts provided on each of two opposite sides thereof; said at least four contacts on the second side of said base board being arranged in the reverse order relative to said at least four contacts on the first side of said base board, and part of said contacts on the first and the second side being electrically connected to one another, enabling said base board of said connector to plug in and electrically connect to a corresponding female connector.

2. The connector as claimed in claim 1, wherein said contacts are strip electrodes.

3. The connector as claimed in claim 1, further comprising a short-circuit protection located on said base board to electrically connect with all of said contacts provided on the first and the second side of said base board.

4. The connector as claimed in claim 3, wherein said short-circuit protection is selected from the group consisting of diode devices, analog switches, and stabilizer ICs.

5. The connector as claimed in claim 1, wherein said female connector is a female USB connector.

6. The connector as claimed in claim 1, wherein said base board is a multi-layer circuit board.

7. A connector, comprising:

a base board having at least four contacts provided on each of two opposite sides thereof; said at least four contacts on the second side of said base board being arranged in the reverse order relative to said at least four contacts on the first side of said base board, and part of said contacts on the first and the second side being electrically connected to one another, enabling said base board of said connector to plug in and electrically connect to a corresponding female connector; and a short-circuit protection located on said base board to electrically connect with all of said contacts provided on the first and the second side of said base board.

8. The connector as claimed in claim 7, wherein said contacts are strip electrodes.

9. The connector as claimed in claim 7, wherein said short-circuit protection is selected from the group consisting of diode devices, analog switches, and stabilizer ICs.

10. The connector as claimed in claim 7, wherein said female connector is a female USB connector.

11. The connector as claimed in claim 7, wherein said base board is a multi-layer circuit board.

12. A connector, comprising a base board having a plurality of contacts provided on each of two opposite side thereof; said a plurality of contacts on the second side of said base board being arranged in the reverse order relative to said a plurality of four contacts on the first side of said base board, and at least three of said contacts on the first and the second side being electrically connected to one another, enabling said base board of said connector to plug in and electrically connect to a corresponding connector on a card slot with either the first or the second side of said base board facing upward relative to said card slot to transmit data.

13. The connector as claimed in claim 12, wherein said contacts are strip electrodes.

14. The connector as claimed in claim 12, wherein said base board is a multi-layer circuit board.

15. The connector as claimed in claim 12, wherein said connector is a memory card connector.

* * * * *